June 27, 1950          A. L. RICE          2,512,876
DUAL CONTROL MECHANISM FOR MOTOR VEHICLES
Filed Oct. 20, 1947          2 Sheets-Sheet 1
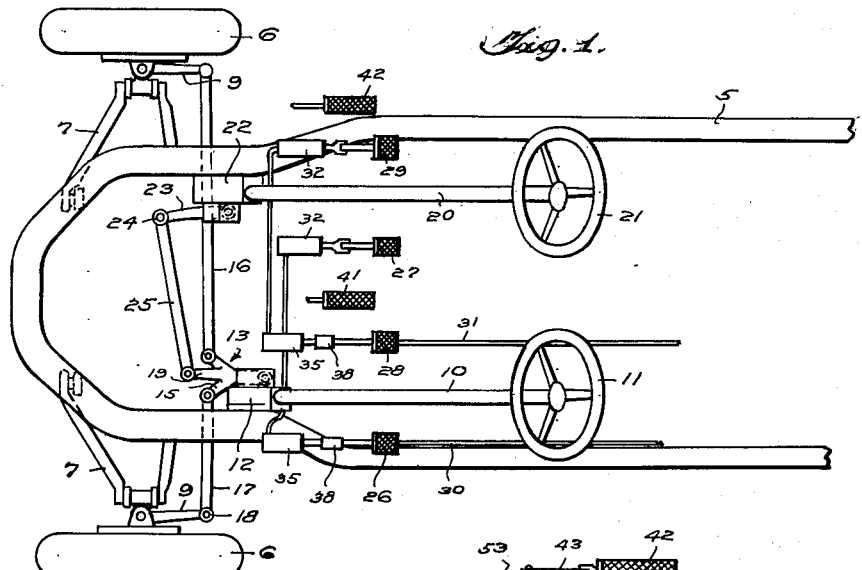
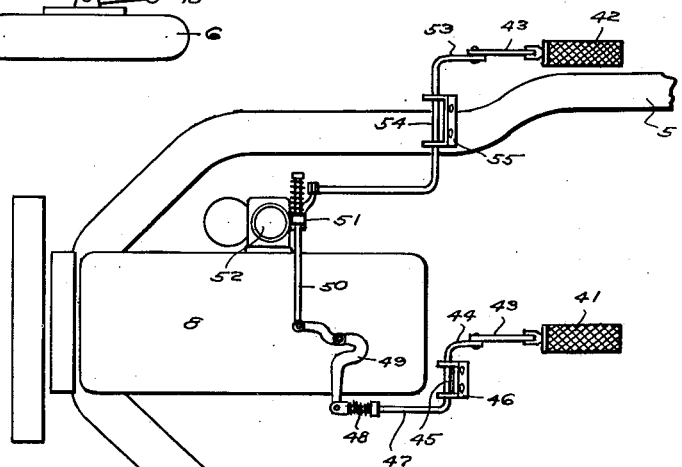
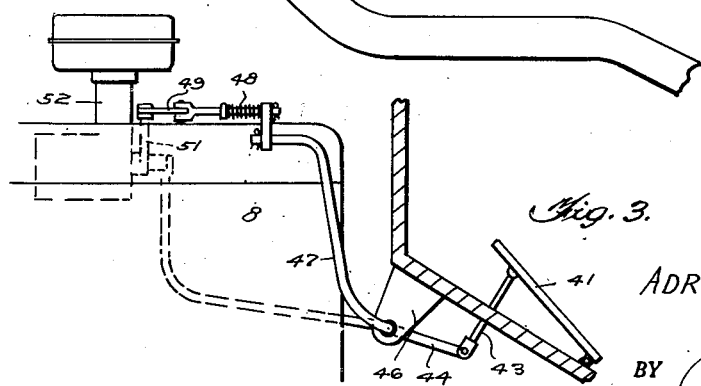
ADRIAN L. RICE
INVENTOR.
BY
ATTORNEY June 27, 1950  A. L. RICE  2,512,876
DUAL CONTROL MECHANISM FOR MOTOR VEHICLES
Filed Oct. 20, 1947  2 Sheets-Sheet 2
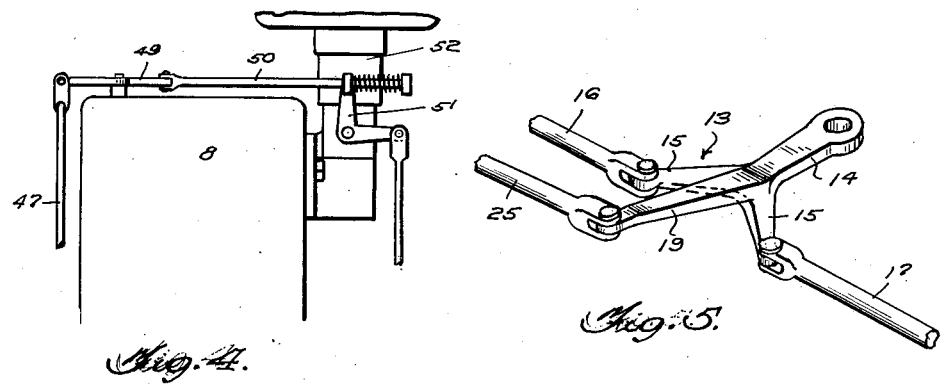
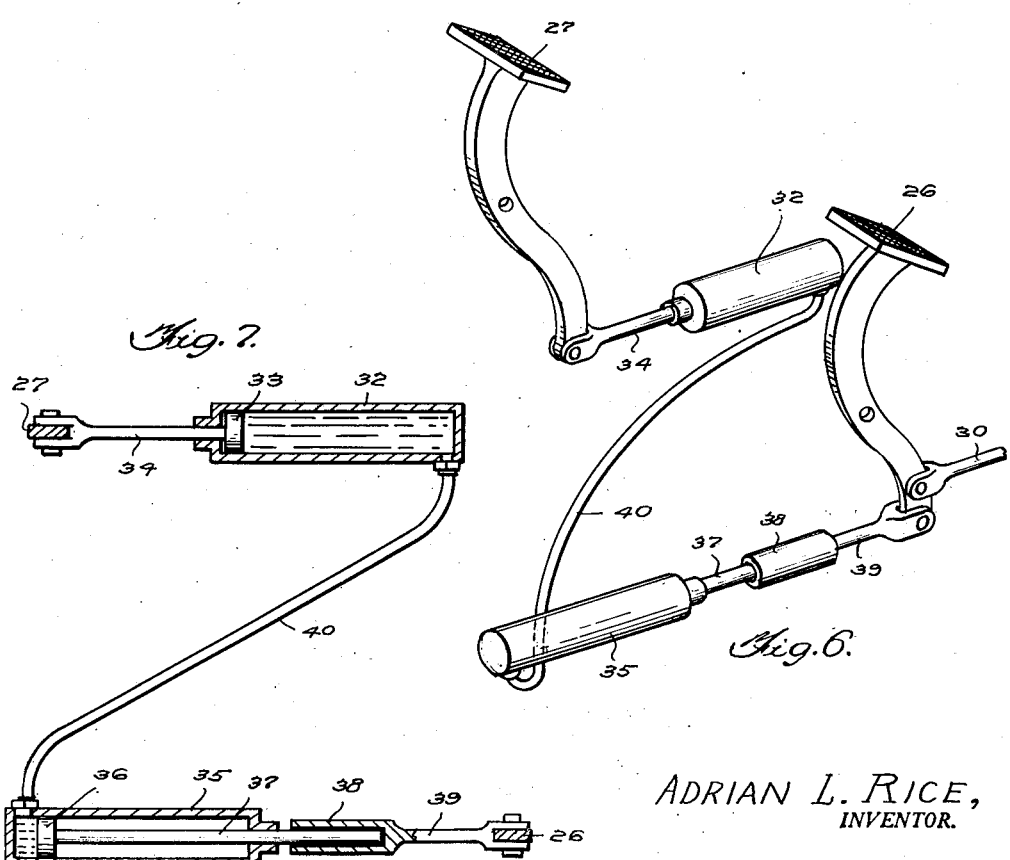
ADRIAN L. RICE,
INVENTOR.
BY
ATTORNEY Patented June 27, 1950

2,512,876

UNITED STATES PATENT OFFICE 2,512,876

DUAL CONTROL MECHANISM FOR MOTOR VEHICLES

Adrian L. Rice, Miami, Fla.

Application October 20, 1947, Serial No. 780,995

1 Claim. (Cl. 180—77)

This invention relates to improvements in motor vehicles and has particular reference to motor vehicles for purposes of driver instruction.

It is an object of the invention to provide a vehicle for the above mentioned purposes having dual steering mechanism and dual control pedals for the clutch, brakes and accelerator.

A further object of the invention resides in the provision of a dual steering mechanism having a conventional steering pitman operatively connected by tie rods to the steering knuckles of the front wheels and an auxiliary steering mechanism having a pitman and tie rod operatively connected to the conventional pitman for an equal distribution of stress and strain to the wheel connected tie rods.

Another and important object of the invention comprises dual control pedals for the brakes and clutch, so interconnected by hydraulic means as to permit independent operation of the pedals by either the instructor or the student, thus permitting the student to apply the brakes or disengage the clutch without effecting the pedals of the instructor, while the motion of the instructor's pedals are transmitted to those of the student.

A further object resides in the provision of dual carburetor control pedals and linkage, either of which is independently controlled by either the instructor or the student.

Other important objects of the invention reside in the extreme simplicity of the mechanism employed, possessing relatively few and simple parts of a nature calculated to minimize wear, are positive in action, lending to the student the confidence of complete control, avoids unusual strain on either tie rod, is cheap to manufacture and install and is highly efficient in use.

Other objects will readily present themselves during the course of the following description, reference being had to the accompanying drawings.

In the drawings,

Figure 1 is a plan view of a vehicle showing the invention in use and with parts omitted for purposes of illustration, Figure 2 is a plan view of the forward end of the vehicle chassis, illustrating a dual control mechanism for the carburetor, Figure 3 is a side elevation of the mechanism illustrated in Figure 2, Figure 4 is a rear fragmentary elevation of the vehicle engine, showing the linkage connections for the carburetor, Figure 5 is a perspective view of an improved steering pitman and its connected tie rods, Figure 6 is a perspective view of one pair of control pedals and their interconnected hydraulic connection and, Figure 7 is a horizontal section through the hydraulic means of one pair of pedals as illustrated in Figure 6.

Like numerals are employed to designate like parts throughout the several views of the drawings.

Referring specifically to the drawings, the numeral 5 designates the chassis of a conventional modern automobile, having ground wheels 6, the usual wheel mounting arms 7 and motor 8. The wheels illustrated being the front wheels of the vehicle, embody the usual spindle and steering arms 9. A steering column 10 and hand steering wheel 11 are mounted in the usual manner to the chassis frame through the medium of the worm housing 12, see Figure 1 and the housing supported worm and worm wheel, not illustrated serve to control the movement of a steering pitman, designated as a whole by the numeral 13, see particularly Figures 1 and 5. The pitman includes a mounting body portion 14 having a head for keyed connection to the worm mechanism and a pair of divergent arms 15 having pivotal or ball and socket connection with long and short tie rods 16 and 17, respectively. The tie rods, at their opposite ends have pivotal connection with the steering arms 9, as at 18. The pitman 13 further includes an integral arm 19, upwardly inclined and forwardly extending in alignment with the arm 14. The pitman may be manufactured with the three arms 15 and 19, or the conventional pitman having merely the arms 15 may be employed and the arm 19 subsequently welded or otherwise attached thereto. An auxiliary steering column 20, having a hand steering wheel 21 is mounted upon the vehicle chassis through the medium of the usual worm and worm wheel housing 22 and serves to control the movement of the auxiliary pitman 23. The pitman 23 has pivotal connection at 24 with a tie rod 25, while the rod 25 has pivotal connection with the arm 19 of the pitman 13. It will be observed, that the housing 22 is mounted forwardly of the housing 12, for well known clearance purposes in export models of vehicles and the length of the pitmans 13 and 23 are identical to maintain an equal steering movement of the hand wheels 11 and 21.

Since dual steering of motor vehicles is old in the art, invention must of necessity be directed to the improved means for controlling the steering movement of the ground wheels 6. Applicant is aware that dual control steering has been employed by connecting the auxiliary tie rod to the long tie rod 16. However, it was found, that the tie rod 16 under those conditions was subjected to severe strains, with a tendency to buckle and wear unevenly. With this objectionable condition in mind, a special pitman 13 was provided, having the three arms 15, and 19 for connection to the conventional tie rods 16 and 17 and the auxiliary tie rod 25. Obviously, all stresses and strains will be evenly distributed, with the major strain being placed upon the pitman 13, but with no greater degree than before. It will therefore be clear, that the steering of the vehicle may be completely controlled from either side with equal ease.

Dual controls for the clutch and the brakes are essential in this type of vehicle and include upon opposite sides of the vehicle clutch pedals 26 and 27 and brake pedals 28 and 29, being identical in shape and size and the pedals 26 and 28 have pivotal connections with clutch and brake control rods 30 and 31. The rods 30 and 31 have been extended rearwardly of the pedals 26 and 28, merely to show a linkage from the pedals, but it should be understood, that the mechanical linkage to both the brake and the clutch will be of conventional form and operation and forms no part of the present invention. Each pair of pedals 26 and 27 and 28 and 29 are interconnected through the medium of a hydraulic system including a cylinder 32 having a piston 33, controlled by a piston rod 34, the outer end of which is pivotally connected to the pedal 27 or 29. A hydraulic cylinder 35, having a piston 36 slidable therein and carrying a piston rod 37, is mounted in the line of movement of the lower end of the pedal 26. Slidably engaging the outer free end of the rod 37, is a sleeve 38, carried by a rod 39, the free end of which has pivotal connection with the lower end of the pedal 26. Tubing 40 connects the cylinders 32 and 35 of both identical pairs and serves to conduct fluid from one cylinder to the other. The purpose of this hydraulic connection is to enable the instructor or student, as the case may be, to operate the pedal 26 for a movement of the clutch without effecting the movement of pedal 27. This freedom of movement of the pedal 26 is possible due to the freely slidable sleeve 38 upon the piston rod 37. However, a depression of the pedal 27 will cause the piston 33 to force fluid through the tubing 40, causing the piston 36 to project the rod 37 outwardly to force the tubular sleeve and its rod 38 and 39 rearwardly to depress the pedal 26. While all the pedals are shown as being directly connected to the clutch and brake system, it is obvious, that only the pedals on the driver side may be directly connected and the pedals on the student side connected to the positive action pedals on the driver side through the hydraulic system just described, thus eliminating the additional linkage that would be required. With this hydraulic system, a positive control is had with the clutch and brakes from either side of the vehicle, while the driver may actuate his controls independently of the student. The use of the hydraulic system further eliminates the considerable wear that would be present in a straight mechanical linkage, coupled with the added cost and difficulty of installation.

It becomes necessary in the use of instruction vehicles to enable the student to actuate the several controls to better acquaint him with a full control of the vehicle and to make this possible, dual control accelerator pedals 41 and 42 have been provided. These pedals are mounted in the usual manner upon the floor of the vehicle upon opposite sides thereof and each has connection with a push rod 43, extending downwardly through the floor. The push rod 43, upon the pedal 41, has pivotal connection with a crank arm 44, integral with a right angle shaft 45, rotatably supported in a suitable bracket 46. The shaft 45 is bent at a right angle upon the opposite side of the bracket and curves forwardly and upwardly, as indicated at 47, with its terminal end connected to an adjustable rod 48. The rod 48 in turn has pivotal connection with a conventional bell-crank lever 49, supported upon the head of the motor 8, while the opposite end of the bell-crank 49 has pivotal connection with the throttle actuating rod 50 in turn having the usual connection with the throttle bell-crank lever 51. With the structure so far described, a depression of the pedal 41 results in a rocking of the shaft 45, causing the extended end 47 to swing rearwardly, pulling upon the rod 48 and rocking the bell-crank lever 49, moving the rod 50 transversely of the motor and actuating the throttle of the carburetor 52.

The auxiliary accelerator pedal 42 has pivotal connection with a crank arm 53 upon a rock-shaft 54, mounted in a bracket 55. The rod forming the crank and rock-shaft 53 and 54 is bent forwardly and upwardly, as indicated in dotted lines in Figure 3, with its terminal end having pivotal connection with the opposite arm of the bell-crank lever 51. Obviously, a depression of the pedal 42 results in a rocking of the shaft 54, causing the terminal end of the rod to be elevated for imparting a rocking movement to the bell-crank 51 to control the throttle. Therefore, it will be seen, that either the driver or the student may readily actuate the throttle independently through the use of his respective pedal 41 or 42. Obviously, the linkage employed for the carburetor controls may vary when used upon different vehicles by reshaping the several parts while maintaining the same general arrangement.

It will be seen from the foregoing, that an extremely simple and efficient system has been provided for the dual control of a vehicle. The improved steering connections have eliminated the highly objectional methods heretofore employed by centralizing the stress and strain of steering upon the primary pitman that has been designed for such strain, thereby removing the unequal strain heretofore placed upon one of the tie rods. The hydraulic connections between the pairs of pedals provides a relatively cheap and highly efficient method of clutch and brake controls, providing, in effect, a control means that enables a person to drive the vehicle when alone in a normal manner without the additional pressure that would be necessary, were the pedals positively connected by mechanical linkage. The additional control features embodying the accelerator pedals also provide for an independently controlled carburetor. The structure has few and simple parts, requiring a minimum of attention, is free from rattling, positive in action, easily installed at a relatively low cost and serves its purpose in a highly efficient manner.

It is to be understood, that the invention is not limited to the precise arrangement shown, but that it includes within its purview, whatever changes fairly come within either the terms or the spirit of the appended claim.

Having described my invention, what I claim is:

In a steering mechanism for motor vehicles having primary and auxiliary steering devices upon opposite sides thereof and dual controls for the brake and clutch pedals with the steering devices provided with pitmans at their lower ends, of a pitman carried by one of the steering devices that is provided with a pair of identical outwardly divergent arms and an intermediate forwardly and upwardly inclined arm, with the intermediate arm terminating in a plane above the divergent arms, the divergent arms at their extremities having pivotal connection with oppositely extending wheel connected tie rods and the intermediate arm at its extremity having pivotal connection with a tie rod from the pitman of the opposite steering mechanism, the elevated intermediate arm permitting full swinging movement of the pitman with clearance between the wheel connected tie rods and the tie rod of the opposite steering mechanism.

ADRIAN L. RICE.

REFERENCES CITED

The following references are of record in the file of this patent:

UNITED STATES PATENTS

| Number | Name | Date |
|---|---|---|
| 2,120,294 | Perry | June 14, 1938 |
| 2,173,667 | Slack | Sept. 19, 1939 |
| 2,406,261 | Sprinkel | Aug. 20, 1946 |